United States Patent [19]

Whitworth

[11] 4,299,105
[45] Nov. 10, 1981

[54] FORMING PERMANENT BENDS IN CONVOLUTED REINFORCED FLEXIBLE TUBING

[76] Inventor: Barrie F. Whitworth, Lower Green House, Green La., Hove Edge, Brighouse, West Yorkshire, HD6 2PT, England

[21] Appl. No.: 79,404

[22] Filed: Sep. 27, 1979

[30] Foreign Application Priority Data

Sep. 28, 1978 [GB] United Kingdom ............ 38515/78

[51] Int. Cl.³ .......................................... B21D 22/10
[52] U.S. Cl. .................................... 72/54; 72/369
[58] Field of Search ............. 72/54, 63, 702, 369, 72/46, 50, 58; 29/421 R

[56] References Cited

U.S. PATENT DOCUMENTS

| | | | |
|---|---|---|---|
| 3,085,919 | 4/1963 | Clark | 138/174 UX |
| 3,739,615 | 6/1973 | Tressel | 72/369 |
| 4,195,390 | 4/1980 | Amen | 29/421 R X |

FOREIGN PATENT DOCUMENTS 2009370 9/1970 Fed. Rep. of Germany ........ 72/702

*Primary Examiner*—Leon Gilden
*Attorney, Agent, or Firm*—Reising, Ethington, Barnard, Perry & Brooks

[57] ABSTRACT

A method of forming a permanent curve in a length of convoluted wire-reinforced flexible plastics tubing comprises the steps of first flexing the chosen region of the tube into a curve whose radius is tighter than that eventually desired; forcibly holding said region in said tighter than desired curves; applying to the tube an internal pressure which is insufficient to burst the tube but which is high enough to strain the wire-reinforcement, the tube material, or both, in the bend region beyond its or their elastic limit; maintaining said internal pressure for a finite period of time; releasing the pressure; and finally releasing the tube from its preheld curve.

6 Claims, 2 Drawing Figures

FORMING PERMANENT BENDS IN CONVOLUTED REINFORCED FLEXIBLE TUBING

FIELD OF THE INVENTION

This invention relates to a method of forming permanent bends in convoluted reinforced flexible tubing.

The invention is specifically applicable to elongate wire-reinforced flexible plastics tubing. Such tubing is used widely for hydraulic control lines and fluid power transmission generally. Basically, such tubing consists of a preformed flexible convoluted plastics body which is externally sleeved with a wire helix. The helix provides reinforcement whilst being sufficiently resilient to allow the tube to be flexed without assuming any permanent set.

If such tubing is flexed into a curve of desired radius, it must normally be held before and after the arm of the curve if it is to be maintained permanently in its curved state. The present invention constitutes the discovery of a method of forming a permanent curve in tubing of this general kind.

DESCRIPTION OF THE PRIOR ART

The most widespread prior attempt to hold flexible wire-reinforced plastics tubing in a permanent curve is constituted by possible clamping of the tubing before and after the bend region, as outlined above. This requires the use of clamps, which might not be easily positioned. It can also generate stresses in the clamped regions which might weaken the pressure-resistance of the tubing.

Currently known to the applicant are U.K. patent specification Nos. 701112; 833997; and 1029892. Each of these deals with the problem of bending tubing, but between them they show only the general state of the tube-bending art. None of these three prior Patents is directed specifically to the problem of forming permanent bends in convoluted wire-reinforced flexible plastics tubing.

SUMMARY OF THE INVENTION

According to the invention a method of forming convoluted reinforced flexible tubing into a permanent curve comprises the steps of first flexing the tube into a curve whose radius is tighter than that eventually desired, and holding it in that curve, building up inside the tube a pressure which, whilst not sufficient to burst the tube, is high enough to strain the wire reinforcement, the tube material, or both, in the bend region beyond its or their elastic limit; maintaining said pressure for a finite period of time; releasing the pressure; and finally releasing the tube from its preheld curve.

If the pressure, and the time for which it is maintained inside the curved tube, are suitably balanced it will be found that when the pressure is released and the tube is allowed to relax it does not flex straight again but stays in its curved state.

When the tube is next pressurised, there may be a tendency for it to straighten very slightly. After that initial straightening, however, there will normally be no further alteration in the permanently curved nature of the tube. It is to allow for this slight straightening tendency upon initial subsequent pressurisation that the tube is initially flexed into a curve of tighter radius than that eventually desired.

If it is essential that the manufactured curved tubing should conform exactly to an eventually desired radius, the tendency of the tube to straighten slightly on its first subsequent pressurisation can effectively be anticipated by adding to the broadest aspect of the invention the further step of pressurising the now permanently curved tube again, this time without holding its ends in a predetermined curve, to a pressure similar to that originally employed, maintaining that pressure for a finite time; and finally releasing the pressure.

This further step accommodates any remaining tendency of the tube to straighten under pressure, and there will normally be no further deviation from the preformed curve when the tube is subsequently pressurised.

The precise physical changes taking place in the tube in order to cause it to assume this permanent curve are not at present fully understood. It may be that only the tube material is strained beyond its elastic limit and forced into a permanent set. In the case of wire-reinforced convoluted tubing which is further sleeved with smaller-diameter wire braiding, this would appear to be a probable explanation since the slight remaining tendency of the tube to straighten on its first subsequent pressurisation is probably caused by the wire reinforcement and the wire braiding (which can be assumed still to be elastically resilient) exerting a restoring force against the now permanently-deformed P.T.F.E. tube material.

It may be, however, that the wire reinforcement or the braiding, or both, in the bend region are also permanently strained beyond their elastic limit.

In any event, the wire reinforcement and the braiding both assume, after the first subsequent pressurisation of the tube, a new stable permanently-set configuration around the curve of the tube.

DESCRIPTION OF THE PREFERRED METHOD

Figure 1:
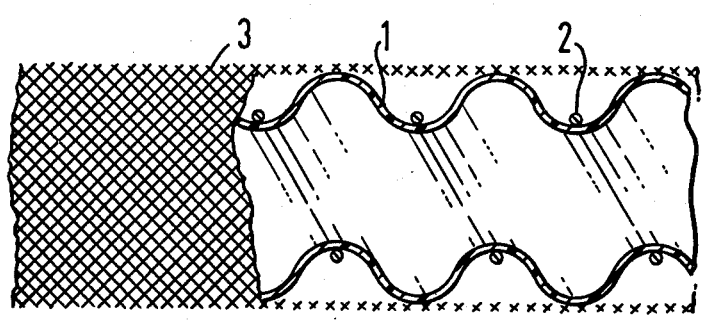
FIG. 1 shows in cross-section a length of convoluted wire-reinforced flexible plastics tubing before bend-forming in accordance with the invention.

By way of example only, one method of forming a permanent curve in a length of wire-reinforced braided convoluted P.T.F.E. tubing comprised the following steps:

P.T.F.E. tubing, internal diameter 1¼ inches wall thickness 0.040 inches, was convoluted and reinforced with stainless steel wire of diameter 1.5 mm. The finished convoluted tube had a pitch of convolution of 2½ turns per inch, an internal diameter of 1 inch and an outside diamter of 1.4 inches. The tube was cut to length and sleeved with stainless steel wire braiding, construction 36 carrier X 12 and X 0.27 millimeters diameter pitch, or lay, of braid when sleeved onto the convoluted tube 4 inches. End fittings were attached and secured.

Methods of manufacturing such tubing, and securing the necessary end fittings, are known in themselves, and the tubing is currently available as a stock item.

The straight elongate flexible tube so formed was then connected at one end to a pressure source capable of exerting 800 p.s.i. hydraulic pressure, and sealed at its other end. The tube was initially filled with water at atmospheric pressure, and the tube bent to a bend radius of 4 inches. Pressure was then built up inside the bent tube to 800 p.s.i. and held for 20 seconds only. The bend radius of 4 inches was maintained during this process by holding the tube firmly clamped at both ends.

Pressure was then reduced to zero. The tube was allowed to relax and assume its natural un-stressed state, pressure of 600 p.s.i. was then re-applied without re-clamping the tube, the bend radius was measured and was found to be 5 inches.

Finally, pressure was increased to 800 p.s.i. for a short period—again without re-clamping the tube—and no further increase in bend radius was observed. Successive further application of pressure 0–600 p.s.i. was found to have no effect in increasing the bend radius from 5 inches.

The drawing illustrates, in part cross-section, the effects observed by the application of these successive steps to the tubing in question.

FIG. 1 shows in cross-section the convoluted wire-reinforced flexible plastics tubing in an un-stressed state and before being bent by the method described above. The main body 1 of the tube is elongate and generally cylindrical, but is helical in cross-section. It is composed of flexible P.T.F.E. It is sleeved with a stainless steel wire helix 2 as described above and overlaid (as also described above) with steel braiding 3.

Figure 2:
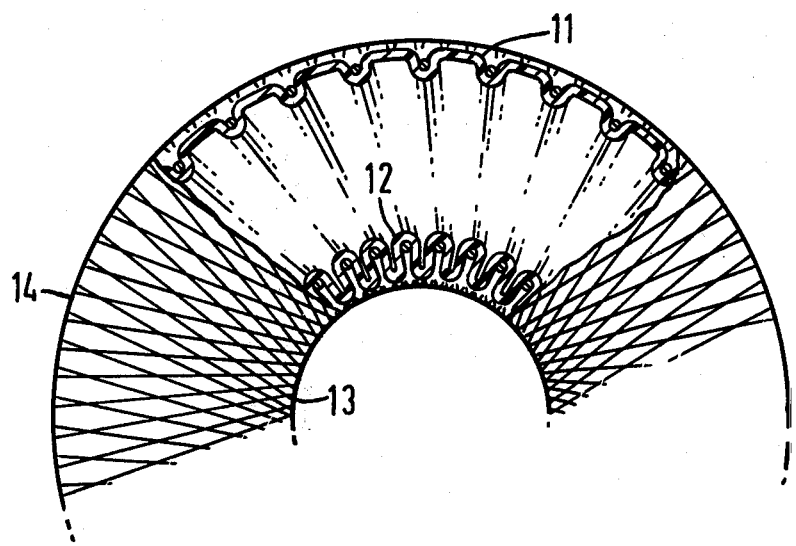
FIG. 2 shows in cross-section the same length of tubing after bend-forming by a method embodying the invention.

FIG. 2 shows, again in cross-section, the form permanently assumed by the tubing after applying the method described above. The convolutions of the tube body 1 are noticably wider and shallower around the outside radius of the bend than they were in the un-stressed state. Conversely the convolutions on the inside radius of the bend are crowded more closely together and are deeper, as indicated by the reference numeral 12 in FIG. 2. The braiding itself is closely packed on the inside radius, as indicated at 13, and much more open-packed and spaced out around the outside radius as indicated at 14.

One important advantage of forming flexible tubing by the method outlined above is that the permanentlyset curved tubing is no longer subject to the internally-applied pressure forces which tend always to straighten a resiliently flexible unformed tube forcibly held in a temporary curve. Because of this, the forces acting on the end supports and fittings of a permanentlycurved preformed tube are significantly less than those acting on the same parts of a forcibly temporarily curved unformed resiliently flexible tube.

I claim:

1. A method of forming a permanent curve in a length of convoluted flexible plastic tube having an outer wire-reinforcement and an inner convoluted surface, the method comprising the steps of:

initially flexing the chosen region of the tube to a curve whose radius is tighter than that eventually desired;

forcibly holding said region of the tube in said tighter than desired curve;

thereafter applying directly to the inner convoluted surface of the flexed and held tube an internal fluid pressure which is insufficient to burst the tube but which is high enough to strain the wire-reinforcement in the bend region beyond its elastic limit;

maintaining said internal pressure for a finite period of time;

releasing the pressure;

and finally releasing the tube from its preheld curve.

2. A method of forming a permanent curve in a length of convoluted flexible plastic tube having an outer wire-reinforcement and an inner convoluted surface, the method comprising the steps of:

initially flexing the chosen region of the tube to a curve whose radius is tighter than that eventually desired;

forcibly holding said region of the tube in said tighter than desired curve;

thereafter applying directly to the inner convoluted surface of the flexed and held tube an internal fluid pressure which is insufficient to burst the tube but which is high enough to strain the tube material in the bend region beyond its elastic limit;

maintaining said internal pressure for a finite period of time;

releasing the pressure;

and finally releasing the tube from its preheld curve.

3. A method of forming a permanent curve in a length of convoluted flexible plastic tube having an outer wire-reinforcement and an inner convoluted surface, the method comprising the steps of:

initially flexing the chosen region of the tube to a curve whose radius is tighter than that eventually desired;

forcibly holding said region of the tube in said tighter than desired curve;

thereafter applying directly to the convoluted inner surface of the flexed and held tube an internal fluid pressure which is insufficient to burst the tube but which is high enough to strain the wire-reinforcement and the tube material in the bend region beyond their elastic limit;

maintaining said internal pressure for a finite period of time;

releasing the pressure;

and finally releasing the tube from its preheld curve.

4. Convoluted wire-reinforced plastic tubing when formed by the method of claim 4.

5. Convoluted wire-reinforced plastic tubing when formed by the method of claim 1, 2, or 3.

6. The method of claim 1, 2 or 3 comprising the further step of pressurizing the now permanently curved tube again, this time without holding the curved region in a predetermined curve, by applying an internal pressure similar to that originally applied; maintaining that pressure for a finite time; and finally releasing the pressure.

* * * * *

UNITED STATES PATENT AND TRADEMARK OFFICE
CERTIFICATE OF CORRECTION

PATENT NO. : 4,299,105

DATED : November 10, 1981

INVENTOR(S) : Barrie F. Whitworth

It is certified that error appears in the above—identified patent and that said Letters Patent is hereby corrected as shown below:

Column 3, line 44
"permanentlyset" should be --permanently set--.

Column 3, line 49
"permanentlycurved" should be --permanently curved--.

Column 4, Claim 4 should read: --The method of Claim 1, 2, or 3 comprising the further step of pressurizing the now permanently curved tube again, this time without holding the curved region in a predetermined curved by applying an internal pressure similar to that originally applied; maintaining that pressure for a finite time; and finally releasing the pressure.--

Column 4, Claim 5 should read: --Convoluted wire-reinforced plastic tubing when formed by the method of Claim 4.--

Column 4, Claim 6 should read: --Convoluted wire-reinforced plastic tubing when formed by the method of Claim 1, 2, or 3.--

Signed and Sealed this

Twentieth Day of July 1982

[SEAL]

Attest:

GERALD J. MOSSINGHOFF

Attesting Officer    Commissioner of Patents and Trademarks